(12) United States Patent
Sato

(10) Patent No.: US 7,130,249 B2
(45) Date of Patent: Oct. 31, 2006

(54) DEVICE FOR INPUTTING TITLE OF RECORDING MEDIUM

(75) Inventor: Makoto Sato, Sagamihara (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/462,075

(22) PCT Filed: May 20, 1998

(86) PCT No.: PCT/JP98/02202

§ 371 (c)(1),
(2), (4) Date: Jan. 6, 2000

(87) PCT Pub. No.: WO99/03103

PCT Pub. Date: Jan. 21, 1999

(65) Prior Publication Data

US 2003/0174591 A1    Sep. 18, 2003

(30) Foreign Application Priority Data

Jul. 6, 1997    (JP)    ................................ 9-196596

(51) Int. Cl.
*G11B 7/085*    (2006.01)
(52) U.S. Cl. .................. 369/30.07; 369/83; 369/84
(58) Field of Classification Search .................... 369/7, 369/14, 30.07, 84, 83; *G11B 7/085, 7/28, G11B 3/64, 27/00*
See application file for complete search history.

(56) References Cited

U.S. PATENT DOCUMENTS

| | | | | |
|---|---|---|---|---|
| 4,615,024 A | * | 9/1986 | Usui | .......................... 369/59.1 |
| 5,041,921 A | * | 8/1991 | Scheffler | ...................... 360/13 |
| 5,063,610 A | * | 11/1991 | Alwadish | ...................... 455/45 |
| 5,475,835 A | * | 12/1995 | Hickey | ........................ 395/600 |
| 5,479,266 A | * | 12/1995 | Young et al. | .................. 386/85 |
| 5,481,296 A | * | 1/1996 | Cragun et al. | .............. 725/136 |
| 5,488,409 A | * | 1/1996 | Yuen et al. | ..................... 348/5 |

(Continued)

FOREIGN PATENT DOCUMENTS

JP    3-233670    * 10/1991

(Continued)

OTHER PUBLICATIONS

Machine translation of JP 9-146528.*

*Primary Examiner*—A M Psitos
(74) *Attorney, Agent, or Firm*—Eric J. Robinson; Robinson Intellectual Property Law Office, P.C.

(57) ABSTRACT

A device for inputting the title of a recording medium readily. When a capturing key of a tuner unit (1) is depressed, a first system controller (7) stores the text information, received currently by an FM multiplexed text broadcasting receiving tuner (3), in a capturing buffer region (5B) of a memory (5). When the disc title of an MD-MO (11) is to be inputted, a title inputting mode is established, and the disc is selected as an input target unit. Thereafter, when a call key and an ENTER key are depressed, the first system controller (7) stores the captured text information in a title inputting region (5C) of the memory (5) in such a way that the information corresponds to the disc which is the input target unit. Thereafter, when the ENTER key and a title inputting key are depressed, the first system controller (7) sends the contents of the title inputting region (5C) to an MD recorder unit (10) and a second system controller (17) records the contents in a UTOC area of the MD-MO (11) before the ejection.

7 Claims, 21 Drawing Sheets

U.S. PATENT DOCUMENTS

| | | | |
|---|---|---|---|
| 5,491,838 A * | 2/1996 | Takahisa et al. | 455/66 |
| 5,585,865 A * | 12/1996 | Amano et al. | 725/14 |
| 5,631,433 A * | 5/1997 | Iida et al. | 84/610 |
| 5,636,314 A * | 6/1997 | Muayama | 386/46 |
| 5,671,195 A * | 9/1997 | Lee | 369/7 |
| 5,862,104 A * | 1/1999 | Matsumoto | 369/7 |
| 5,877,781 A * | 3/1999 | Tomizawa et al. | 345/521 |
| 5,889,747 A * | 3/1999 | Hisamatsu et al. | 369/84 |
| 5,991,440 A * | 11/1999 | Matsubayashi et al. | 382/187 |
| 6,084,829 A * | 7/2000 | Tsutsui | 369/7 |
| 6,091,884 A * | 7/2000 | Yuen et al. | 386/83 |
| 6,104,677 A * | 8/2000 | Kirihara et al. | 369/14 |
| 6,188,662 B1 * | 2/2001 | Maeda et al. | 369/83 |
| 6,222,807 B1 * | 4/2001 | Min-Jae | 369/58 |

FOREIGN PATENT DOCUMENTS

| | | | |
|---|---|---|---|
| JP | 4-105269 | | 4/1992 |
| JP | 4-373284 | | 12/1992 |
| JP | 6-52654 | | 2/1994 |
| JP | 08-050778 | | 2/1996 |
| JP | 8-317331 | | 11/1996 |
| JP | 09-083946 | | 3/1997 |
| JP | 09-135183 | | 5/1997 |
| JP | 9-146528 | * | 6/1997 |
| JP | 9-147532 | | 6/1997 |
| JP | 9-205376 | * | 8/1997 |

* cited by examiner

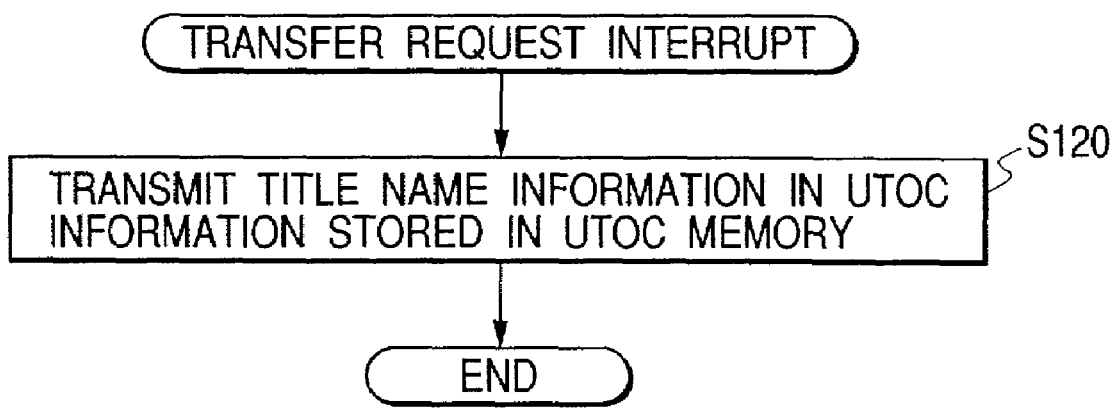
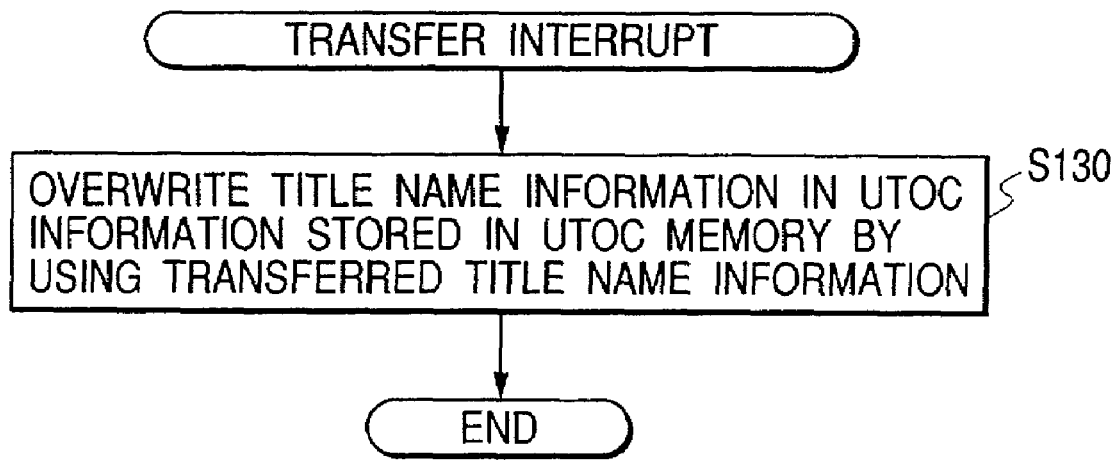

FIG. 10A

```
       1 2 3 4 5 6 7 8 9 10 11 12 13 14 15
TEXT HEADER ⎧ DISC  TITLE              ⎫ 6
ROW         ⎩                          ⎭
MAIN TEXT   ⎧ BEST  HIT  OLDIES        ⎫
ROWS        ⎩ /DAIICHI  CO.            ⎭
                  ↑
              CURSOR K
```

FIG. 10B

```
1 2 3 4 5 6 7 8 9 10 11 12 13 14 15
DISC  TITLE
BEST  HIT  OLDIES
/DAIICHI   _
```

FIG. 10C

```
1 2 3 4 5 6 7 8 9 10 11 12 13 14 15
TNO  002  TITLE
_
```

FIG. 10D

```
1 2 3 4 5 6 7 8 9 10 11 12 13 14 15
STAND·BY·ME BEN·E
·KING
```

1 2 3 4 5 6 7 8 9 10 11 12 13 14 15 16 17 18 19 20 21 22 23 24 25 26 27 28 29 30

⎵ ------ SPACE

* ------ SPACE NOT DELETED DURING CAPTURING PROCESS 1 2 3 4 5 6 7 8 9 10 11 12 13 14 15 16 17 18 19 20 21 22 23 24 25 26 27 28 29 30

⎵ ------ SPACE

* ------ SPACE NOT DELETED DURING CAPTURING PROCESS

FIG. 13A

```
   1 2 3 4 5 6 7 8 9 10 11 12 13 14 15 16 17 18 19 20 21 22 23 24 25 26 27 28 29 30
 0 | OLDIES_DAIICHI_CO._
 1 |
 2 |
 3 |
 4 |
 5 |
 6 |
```
ADDRESS 5B

FIG. 13B

```
   1 2 3 4 5 6 7 8 9 10 11 12 13 14 15 16 17 18 19 20 21 22 23 24 25 26 27 28 29 30
 0 | OLDIES⊔DAIICHI⊔CO.⊔
 1 | STAND·BY·ME⊔BEN·E·KING⊔
 2 |
 3 |
 4 |
 5 |
 6 |
```
ADDRESS 5B

FIG. 15A 1 2 3 4 5 6 7 8 9 10 11 12 13 14 15 16 17 18 19 20 21 22 23 24 25 26 27 28 · · 80

```
000 | BEST␣HIT␣OLDIES␣DAIICHI␣CO.␣
001 | ONLY·YOU/THE PLATTERS␣
002 |
003 |
  ⋮
255 |
```

| 0 0 0 | j                          5C |

ADDRESS

FIG. 15B 1 2 3 4 5 6 7 8 9 10 11 12 13 14 15 16 17 18 19 20 21 22 23 24 25 26 27 28 · · 80

```
000 | BEST␣HIT␣OLDIESDAIICHI␣CO.␣
001 | ONLY·YOU/THE PLATTERS␣
002 |
003 |
  ⋮
255 |
```

| 0 0 0 | j                          5C |

ADDRESS

FIG. 16A 1 2 3 4 5 6 7 8 9 10 11 12 13 14 15 16 17 18 19 20 21 22 23 24 25 26 27 28 · · 80

000 | BEST␣HIT␣OLDIES/DAIICHI␣CO.␣
001 | ONLY·YOU/THE PLATTERS␣
002
003
⋮
255

000  j                                              5C

ADDRESS

FIG. 16B 1 2 3 4 5 6 7 8 9 10 11 12 13 14 15 16 17 18 19 20 21 22 23 24 25 26 27 28 · · 80

000 | BEST␣HIT␣OLDIES/DAIICHI␣
001 | ONLY·YOU/THE PLATTERS␣
002
003
⋮
255

000  j                                              5C

ADDRESS

FIG. 17A 1 2 3 4 5 6 7 8 9 10 11 12 13 14 15 16 17 18 19 20 21 22 23 24 25 26 27 28 · · 80

| 000 | BEST␣HIT␣OLDIES/DAIICHI␣CO.␣ |
| 001 | ONLY·YOU/THE PLATTERS␣ |
| 002 | STAND·BY·ME␣BEN·E·KING␣ |
| 003 | |
| ⋮ | |
| 255 | |

002　j　　　　　　　　　　　5C

ADDRESS

FIG. 17B 1 2 3 4 5 6 7 8 9 10 11 12 13 14 15 16 17 18 19 20 21 22 23 24 25 26 27 28 · · 80

| 000 | BEST␣HIT␣OLDIES/DAIICHI␣CO.␣ |
| 001 | ONLY·YOU/THE·PLATTERS␣ |
| 002 | STAND·BY·ME/BEN·E·KING␣ |
| 003 | |
| ⋮ | |
| 255 | |

002　j　　　　　　　　　　　5C

ADDRESS

TITLE NAME INFORMATION
TRACK NUMBER
000 ······ DISC TITLE NAME

001 ONLY·YOU/THE PLATTERS␣ ······ TRACK TITLE NAME

002 ······ TRACK TITLE NAME

TITLE NAME INFORMATION
TRACK NUMBER
000 BEST␣HIT␣OLDIES/DAIICHI␣ ······ DISC TITLE NAME

001 ONLY·YOU/THE PLATTERS␣ ······ TRACK TITLE NAME

002 STAND·BY·ME/BEN·E·KING␣ ······ TRACK TITLE NAME

FIG. 19A

```
BEST HIT OLDIES/DA
IICHI
```

FIG. 19B

```
ONLY·YOU/THE PLATTERS
```

FIG. 19C

```
STAND·BY·ME/BEN·E·KING
```

DEVICE FOR INPUTTING TITLE OF RECORDING MEDIUM

TECHNICAL FIELD

The present invention relates to a device for inputting a title of a recording medium, and more particularly to a title inputting device capable of facilitating a title input work for a recording medium such as a mini disc (MD).

RELATED BACKGROUND ART

MD-MO (Magnet Optical) is one type of MD and can record and reproduce data. MD-MO can record musical tone signals in each track of a program area. In addition, a disc title name (one name per one MD-MO) and a track title name of each track are recorded in a UTOC (User's Table of Contents) area. During a reproduction suspension, a disc title name is displayed in order for a user to confirm whether the disc is a desired one, and during a reproduction of a track recorded with musical tone signals, the track title name is displayed in order for the user to confirm whether a reproduced music program is a desired one. The disc title name and track title name are not limited to an album name, an album name manufacture name and an artist name, but may be arbitrary character information which can identify a disc or a track at a glance, such as a movie title name, a portion of a music text, an explanation of music, and the name of a person, a district name and a book title respectively not directly related to music.

An MD recorder unit for recording/reproducing data to/from an MD-MO has a text display and a key operating unit for entering a disc title name and a track title name. The key operating unit includes a title input key, character keys (including alphabet, katakana, symbol, numeral, kanji, hiragana), a one-character delete key, a cursor key and an ENTER key. When a disc title name is to be input, the title input key is depressed to enter a title input mode. Thereafter, a track number "000" is entered with numeral keys to indicate that a title input target unit is a disc (the track number 000 indicates a selection of a disc title input). Then, "DISC TITLE" is displayed on the text display in a text header row at the upper side thereof (refer to FIG. 20A), and a cursor (refer to K in FIG. 20A) is displayed at the character start position in the first row of main text rows under the text header row.

If a title name "BEST HIT OLDIES/DAIICHI" is to be input, first a character key "B" is depressed so that "B" is displayed at the character start position in the first row of the main text rows of the text display and the cursor moves to the second character position. Thereafter, characters "E", "S", "T", " " (space), "H", "I", "T", ""(space), "O", "L", "D", "I", "E", "S", "/", "D", "A", "I", "I", "C", "H", "I", and " " (space) are entered so that "BEST HIT OLDIES/DAIICHI" is displayed from the second character position in the first row of the main text rows of the text display to the second main text row and the cursor moves to the tenth character position in the second row of the main text rows (refer to FIG. 20B).

If the character "Q" is erroneously entered instead of the correct character "O", the cursor is returned to the tenth character "Q" in the first row of the main text rows by using the cursor key (refer to FIG. 20C), and the one-character deletion key is depressed so that the characters after "Q" are moved forward by one character and the character "L" is displayed at the position where the character "Q" was deleted (the cursor stays at the tenth character position. Refer to FIG. 20D). Then, the character "O" is entered so that it is displayed between "L" and the " " (space) one character before and the character "L" and following characters are moved backward by one character (the cursor moves to the eleventh character position. Refer to FIG. 21A). If characters "LL" are erroneously entered instead of the correct character "L" (refer to FIG. 21B), the cursor is moved to the eleventh character position in the first row of the main text rows by using the cursor key, and the one-character deletion key is depressed so that the eleventh character "L" is deleted and the twelfth character and following characters are moved forward by one character (the cursor stays at the eleventh character position. Refer to FIG. 21D). If the symbol "/" was not entered (refer to FIG. 21D), the cursor is moved to the character position "D" in the second row of the main text rows and the symbol "/" is entered so that "/" is displayed before "D" and the character "D" and following characters are moved backward by one character (the cursor moves to the second character position in the second row of the main text rows. Refer to FIG. 22A).

After all the characters are correctly entered, the ENTER key is depressed so that the disc title name is settled and the disc title name "BEST HIT OLDIES/DAIICHI is registered in a buffer memory.

If a track title name "オンリー・ユー/フラター_ズ" is desired for a music program at the track number 001, then "001" is entered by using numeral keys in the title input mode to select the first track with recorded musical tone signals as the title input target unit, so that "TNO 001 TITLE" is displayed in the text header row of the text display and the cursor is displayed at the start character in the first row of the main text rows. Then, katakana characters "オ", "ン", "ン", "リ", "−", "•", "ユ", "−", "/", "フ", "ラ", "タ", "−", "ズ", and " " (space) are entered by using character keys so that "オンリー・ユー/フラター_ズ" is displayed in the first row of the main text rows of the text display and the cursor moves to the fourteenth character position (refer to FIG. 22B).

After all the characters are correctly entered, the ENTER key is depressed so that "オンリー・ユー/フラター_ズ" is registered in the buffer memory as the track title name of the track number "001".

After the track title names for all track numbers or desired track numbers of MD-MO are entered in the manner described above, the title input key is again depressed so that the title input mode is released and the contents of the buffer memory are written in a UTOC memory built in a system controller (not shown) of the MD recorder unit. Thereafter, when the power is turned off or an ejection operation is performed, the system controller of the MD recorder unit operates to record the contents of the UTOC memory in the UTOC area of MD-MO before it controls the power-off operation or ejection operation.

When a power-on operation or loading operation is thereafter performed, the power-on operation control or a loading operation control is performed and thereafter UTOC information is read from the UTOC area of MD-MO and written in the UTOC memory. In accordance with the information in the UTOC memory, the disc title name "BEST HIT OLDIES/DAIICHI" is displayed on the text display during the reproduction suspension. During the reproduction of the music program at the track number 001, the track title name "オンリー・ユー/フラター_ズ" is displayed on the text display. Therefore, a user can confirm at a glance whether the disc is a desired one and whether the music program is a desired one.

With a conventional MD recorder unit, however, it is required to enter each character correctly by using character key in order to enter a desired disc title name or a track title name. This work is very cumbersome.

An object of the invention is to solve the above-described problem of conventional techniques and provide a title inputting device for a recording medium capable of easily entering character information of a title name.

DISCLOSURE OF THE INVENTION

A title input device for a recording medium of this invention, comprises: receiving means for receiving text broadcasting and outputting text information; capturing means for storing text means designated by designating means in storage means; calling means for calling desired text information from the storage means; and title name recording means responsive to an operation of the calling means, for reading the desired text information called by the calling means from the text information stored in the storage means and recording the desired text information in a recording medium.

A title input device for a recording medium of this invention, comprises: receiving means for receiving text broadcasting and outputting received text information; display means for displaying the received text information output from the receiving means; capturing means for storing the received text information in capturing storage means when capturing instruction operation means instructs to capture the received text information; selection operation means for selecting a title input target unit of the recording medium; call operation means for instructing to call desired received text information from the capturing storage means; and title name recording means for reading the desired received text information instructed to be called by said call operation means from the received text information stored in the capturing storage means and recording the desired received text information in the recording medium as a title name of the title input target unit selected by the selection operation means, in response to operations of the call operation means and said selection operation means.

Accordingly, it is possible to capture the desired text information from the text information received from text broadcasting, use the desired text information as a title name of a desired title input target, and record it in a recording medium. The user title input work can be reduced considerably.

In the title input device for a recording medium of this invention, the capturing means deletes redundant text information when the capturing means stores the received text information in the capturing storage means when the capturing instruction operation means instructs to capture the received text information.

Accordingly, for example, even if redundant text information such as spaces is contained in the desired text information received and captured from text broadcasting, the text information without the redundant text information can be recorded in the recording medium. The displayed title name read thereafter from the recording medium can be easy to be read. A work of deleting redundant text information such as spaces to make the title name easy to be read, can be omitted.

In the title input device for a recording medium of this invention, the title name recording means deletes redundant text information when the title name recording means reads the desired received text information instructed to be called by the call operation means from the received text information stored in the capturing storage means and records the desired received text information in the recording medium as a title name of the title input target unit selected by the selection operation means.

Also in this case, for example, even if redundant text information such as spaces is contained in the desired text information received and captured from text broadcasting, the text information without the redundant text information can be recorded in the recording medium. The displayed title name read thereafter from the recording medium can be easy to be read. A work of deleting redundant text information such as spaces to make the title name easy to be read, can be omitted.

A title input device for a recording medium of this invention comprises: receiving means for receiving text broadcasting and outputting received text information; display means for displaying the received text information output from the receiving means; capturing means for storing the received text information in capturing storage means when capturing instruction operation means instructs to capture the received text information; input operation means for selecting a title input target unit of the recording medium and inputting a title name character; title name storing means for storing a title name input by a user in correspondence to each title input target unit; call operation means for instructing to call desired received text information from the capturing storage means; title name input processing means for writing a title name character input by the user in the title name storage means in correspondence to the title input target unit desired by the user, reading the desired text information stored in the capturing storage means when the call operation means instructs to call the desired received text information, and writing the title name in the title name storage means in correspondence with the title input target unit desired by the user, in response to an operation of the input operation means; and title name recording means for recording the title name corresponding to the title input target unit and stored in the title name storage means in the recording medium at a predetermined timing.

Accordingly, it is possible to capture the desired text information from the text information received from text broadcasting and use the desired text information as a portion of a title name of a desired title input target. Therefore, a desired title name can be formed by partially changing the captured text information or adding new text information before or after the captured text information.

In the title input device for a recording medium of this invention, the capturing means deletes redundant text information when the capturing means stores the received text information in the capturing storage means when the capturing instruction operation means instructs to capture the received text information.

Accordingly, for example, even if redundant text information such as spaces is contained in the desired text information received and captured from text broadcasting, the text information without the redundant text information can be recorded in the title name storage means. A work of deleting redundant text information such as spaces to make the title name easy to be read, can be omitted.

In the title input device for a recording medium of this invention, the title name input processing means deletes redundant text information when the title name input processing means reads the desired text information stored in the capturing storage means when said call operation means instructs to call the desired received text information, and writes the title name in the title name storage means in correspondence with the title input target unit desired by the user.

Accordingly, for example, even if redundant text information such as spaces is contained in the desired text information received and captured from text broadcasting, the text information without the redundant text information can be recorded in the recording medium. A work of deleting redundant text information such as spaces to make the title name easy to be read, can be omitted.

BRIEF DESCRIPTION OF THE DRAWINGS

FIG. 6 is a flow chart illustrating a control operation to be executed by the second system controller.

FIG. 7 is a flow chart illustrating a control operation to be executed by the second system controller.

FIGS. 10A to 10D are diagrams illustrating the display contents of the text display of the tuner unit.

FIGS. 13A and 13B are diagrams illustrating the contents of the memory a capturing buffer region in of the tuner unit.

FIGS. 15A and 15B are diagrams illustrating the contents of the title inputting region in the memory of the tuner unit.

FIGS. 16A and 16B are diagrams illustrating the contents of the title inputting region in the memory of the tuner unit.

FIGS. 17A and 17B are diagrams illustrating the contents of the title inputting region in the memory of the tuner unit.

FIGS. 19A to 19C are diagrams illustrating the display contents of a text display of an MD recorder unit.

FIGS. 22A to 22D are diagrams illustrating the display contents of the conventional text display during a title input operation.

BEST MODE FOR PRACTICING THE INVENTION

Figure 1:
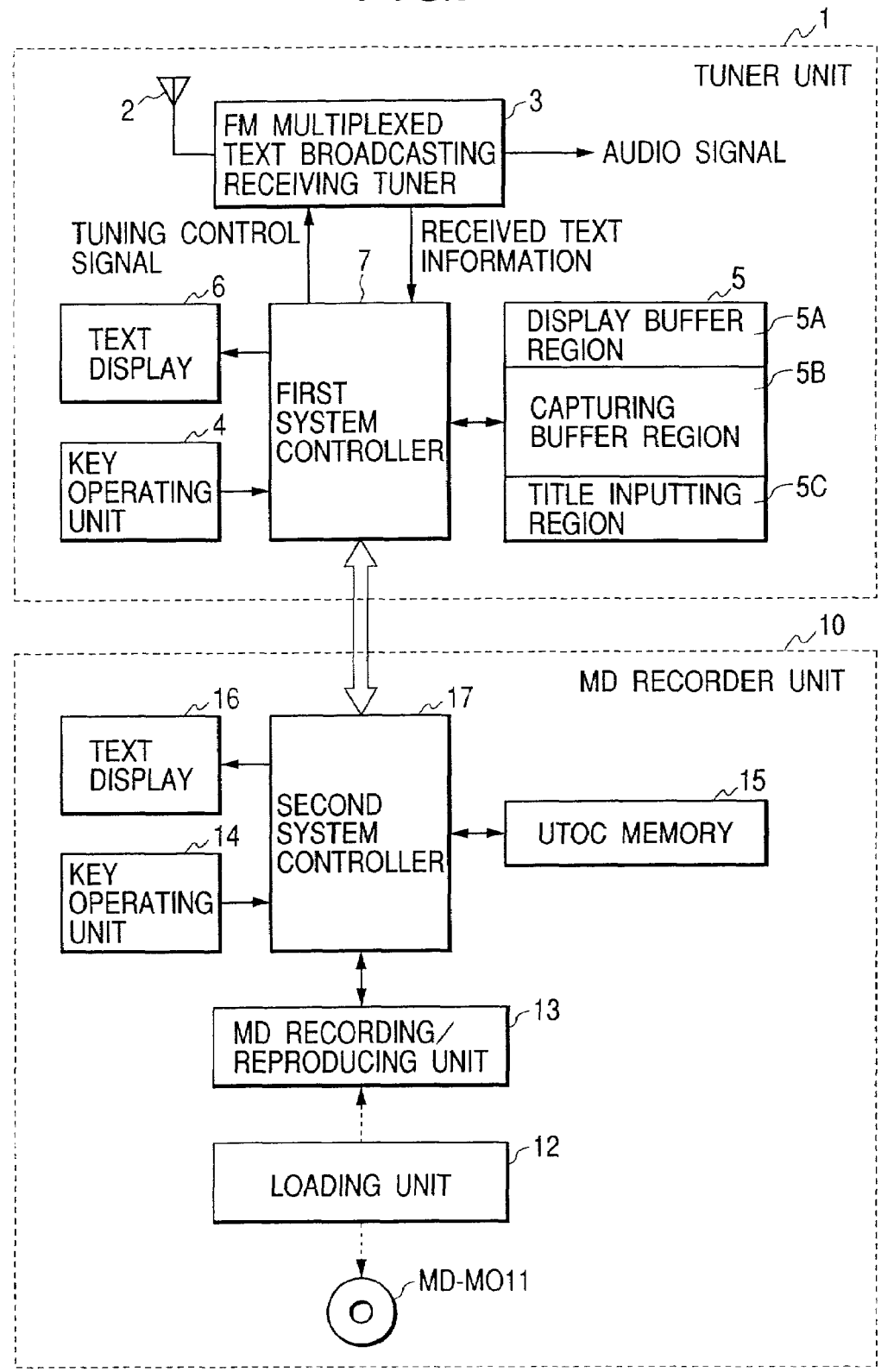
FIG. 1 is a block diagram of an audio system according to an embodiment of the invention.

Next, an embodiment of the invention will be described with reference to FIG. 1. FIG. 1 is a block diagram of an audio system of this invention.

Reference numeral 1 represents a tuner unit which has an antenna 2 for receiving a radio wave of FM multiplexed text broadcasting and an FM multiplexed text broadcasting receiving tuner 3 (hereinafter simply called a "tuner") connected to the antenna 2 for receiving a radio wave of FM multiplexed text broadcasting and outputting audio signals and text information. It is assumed herein that the tuner 3 receives text information in Level 1 and outputs it. The text information includes a program name, a music program name, an artist name, weather forecasting, news, traffic information and the like. In Level 1, text information of a main text is received in the unit of page and one page of the main text is constituted of 2 rows×15 characters. Reference numeral 6 represents a text display which has a display size of 2.5 rows×15 characters as shown in FIG. 8. The upper 0.5 row is a text header row, and the two rows under the text header row is main text rows.

Reference numeral 5 represents a rewritable memory capable of holding data even when the power is turned off, such as EEPROM or a memory backed up with a battery. The memory 5 has a display buffer region SA (refer to FIG. 12) for storing the received latest main text of one page supplied from the tuner 3, a capturing buffer region 5B (refer to FIG. 13) for storing received text information of seven pages which a user designated and captured from the FM multiplexed text broadcasting, and a title inputting region 50 (refer to FIGS. 14 to 17) to be used for an input process of a title name of an MD-MO to be described later. The title inputting region 50 has a capacity capable of storing 80 characters per each title input target unit of track numbers 000 to 255. Reference numeral 4 represents a key operating unit which has: a power on/off switch for turning on/off each block of the tuner unit 1; a station select key for selecting a broadcasting station at the tuner 3; a capturing key 4A for capturing received text information; a title input key 4B for turning on/off a title input mode; character keys (including alphabet, katakana, symbol, numeral and the like) for entering title name characters and track numbers 000 to 255 (track number 000 indicates that the title input target unit is a disc, and track numbers 001 to 255 indicate that the title input target unit is a track in which actual musical tone signals are recorded); a one-character delete key; a cursor key; a received text information call key 4C; a next key for selecting received text information to be called; an ENTER key and the like.

Reference numeral 7 represents a first system controller made of a microcomputer. The first system controller controls: to turn on/off a power of each block of the tuner unit 1 in response to an operation of the power on/off key of the key operating unit 4; to tune in a desired station by supplying a predetermined tuning control signal to the tuner in response to an operation of the station select key; to store the received latest main text information output from the tuner in the display buffer region 5A of the memory 5 in the unit of page, and to control the text display 6 and display the received main text information on the text display during an off-state of a title input mode. When the capturing key is depressed in the off-state of the title input mode, the first system controller 7 writes the received main text information of one page stored in the display buffer region 5A, in the capturing buffer region 5B. In this case, redundant text information such as consecutive spaces in the received main text information is deleted before the received main text information is written.

When the title input key of the key operating unit 4 is depressed, the first system controller 7 sets the title input mode and performs a title text information input process of entering a disc title name of a disc of the input target unit or a track title name of a track of the input target unit in which musical tone signals are recorded, in accordance with the operations of the character keys (including alphabet, katakana, space, symbol, numeral, kanji, hiragana), one-character delete key, cursor key, call key, next key and ENTER key. When the call key is depressed, the first system controller 7 makes the text display 6 display the received main text information of one page captured in the capturing buffer region 5B, and makes the text display 6 display other received main text information in response to an operation of the next key. When desired received main text information is displayed and the ENTER key is depressed, the displayed received main text information is read from the capturing buffer region 5B and written in the title inputting region 5C in such a way that the information corresponds to a desired title input target unit preselected by a user, either a disc or a track of one of the track numbers 001 to 255.

When the title input key is again depressed, the first system controller 7 transfers the contents of the title inputting region 5C to a second system controller to be descried later, and thereafter turns off the title input mode.

Reference numeral 10 represents an MD recorder unit. Reference numeral 11 represents an MD-MO capable of recording/reproducing data, and reference numeral 12 represents a loading unit for loading/unloading MD-MO 11 on a tray (not shown). Reference numeral 13 represents an MD recording/reproducing unit for reproducing data recorded in MD-MO 11 and recording data in MD-MO 11. Reference numeral 14 represents a key operating unit having a loading key, an eject key, a PLAY key, a STOP key, a power on/off key and the like. Reference numeral 15 represents a UTOC memory for storing UTOC information read from an UTOC area of MD-MO 11. Reference numeral 16 represents a text display for displaying a disc title name, a track title name and the like.

Reference numeral 17 represents the second system controller made of a microcomputer. When the power on/off key of the key operating unit 14 is depressed, the second system controller 17 performs a power on/off control for each block of the MD recorder unit 10. When the loading key is depressed in a power-on state, the second system controller 17 controls the loading unit 12 to load MD-MO 11 placed on the tray on the MD recording/reproducing unit 13, controls the MD recording/reproducing unit 13 to read the UTOC information from the UTOC area and store it in the UTOC memory 15, and controls the text display 16 to display the disc title name if the title name information in the UTOC information contains the disc title name. When the PLAY key of the key operating unit 14 is depressed, the second system controller 17 controls the MD recording/reproducing unit 13 to sequentially reproduce music programs recorded in MD-MO 11 starting from the first music program (track number 001). In this case, if the track title name of a track under reproduction is contained in the title name information in the UTOC information, the second system controller 17 controls the text display 16 to display the track title name. When the STOP key is depressed, the second system controller 17 performs a STOP control.

Upon reception of a transfer request signal for the UTOC information from the first system controller 7 of the tuner unit 1, the second system controller 17 transfers the title name information in the UTOC information stored in the UTOC memory 15, to the first system controller, and when the title name information is transferred from the first system controller, rewrites the title name information of the UTOC information stored in the UTOC memory 15. When the eject key of the key operating unit 14 is depressed thereafter, the second system controller 17 controls the MD recording/reproducing unit 13 to record the contents of the UTOC memory 15 in the UTOC area of MD-MO 11, and thereafter controls the loading unit 12 to unload MD-MO 11 placed on the tray. Also, when the power-off operation is performed, the second system controller 17 controls the MD recording/reproducing unit 13 to record the contents of the UTOC memory 15 in the UTOC are of MD-MO 11 and thereafter performs the power-off control.

Figure 2:
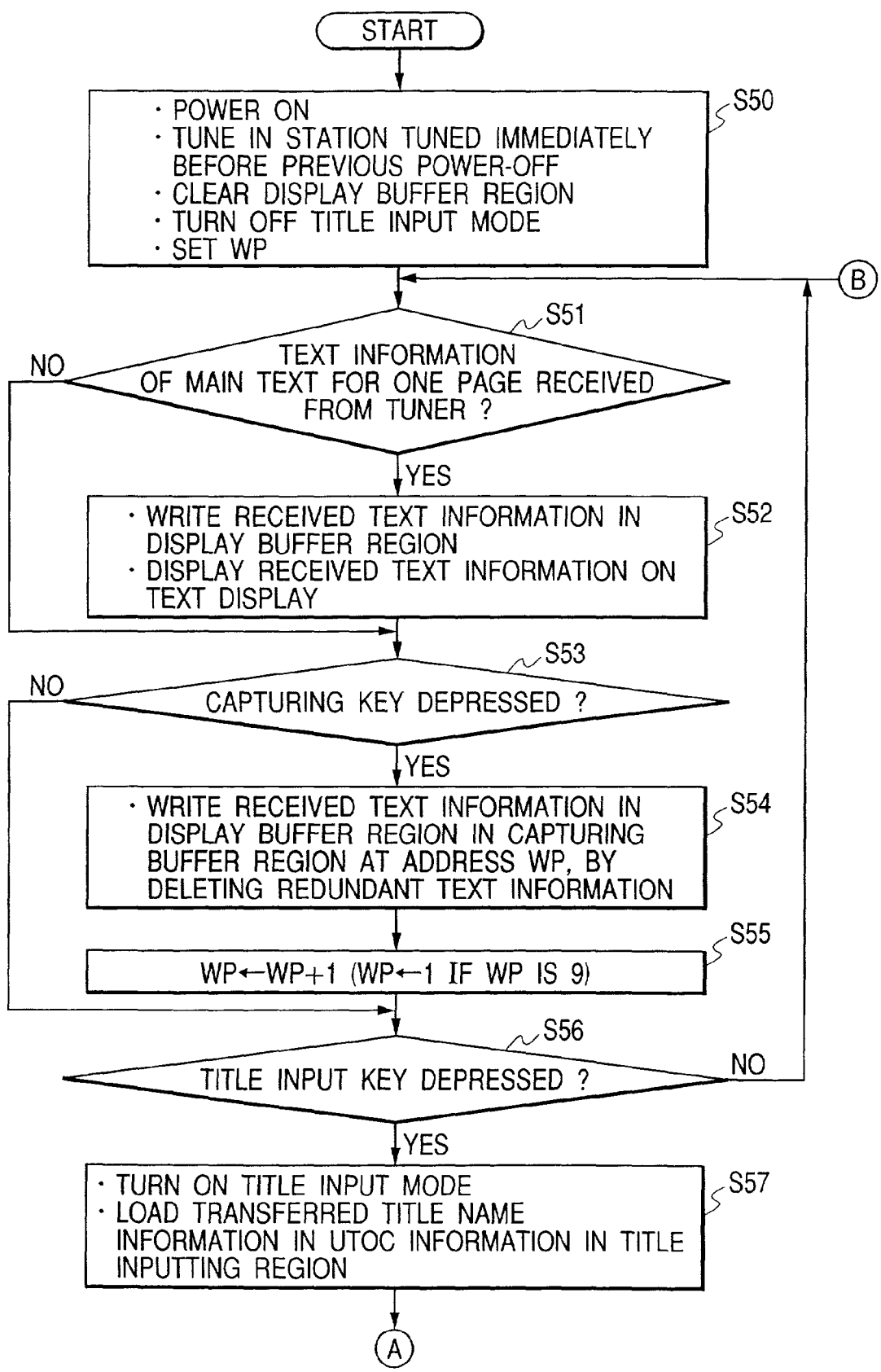
FIG. 2 is a flow chart illustrating a control operation to be executed by a first system controller.
Figure 3:
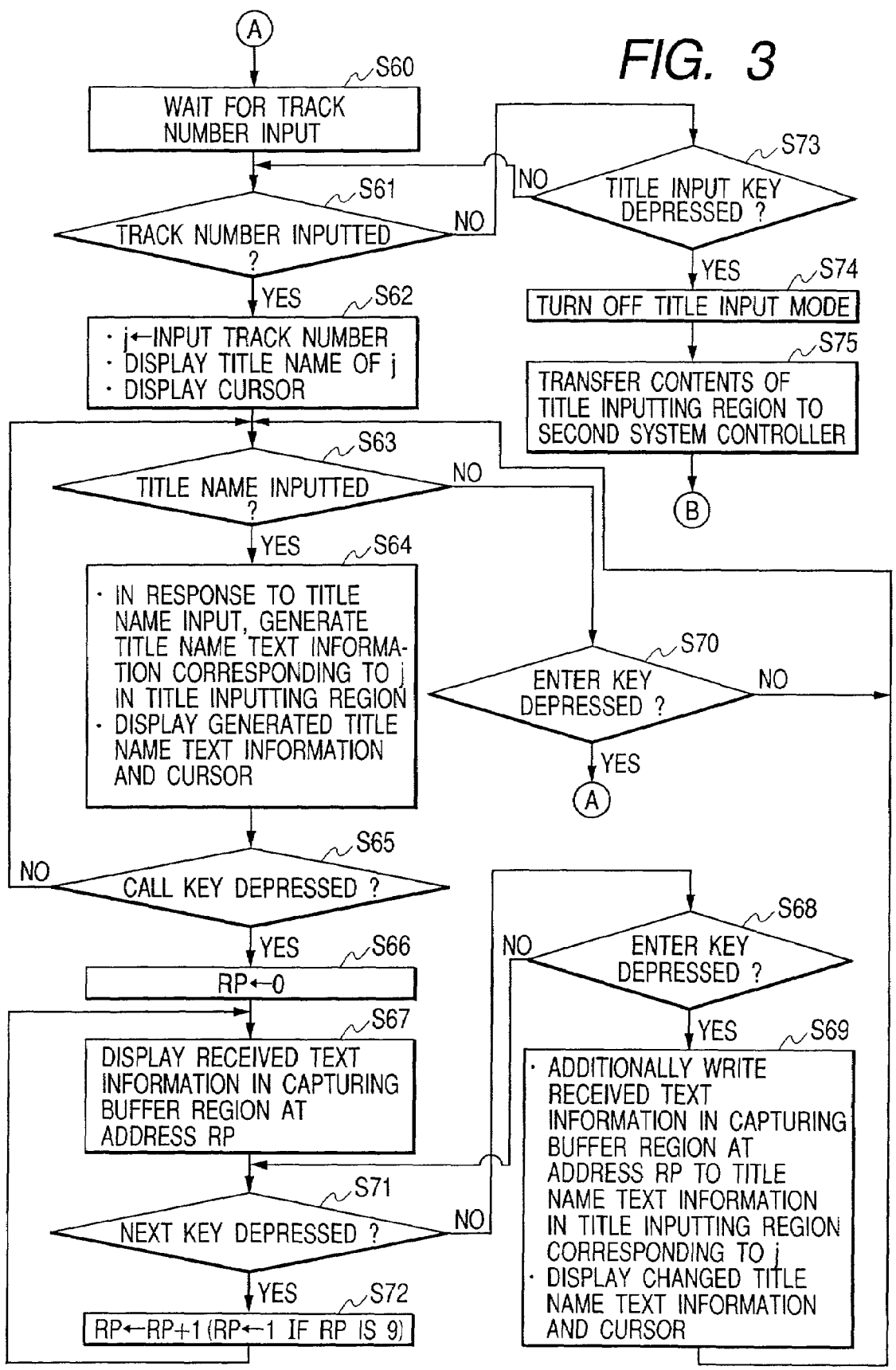
FIG. 3 is a flow chart illustrating a control operation to be executed by the first system controller.
Figure 4:
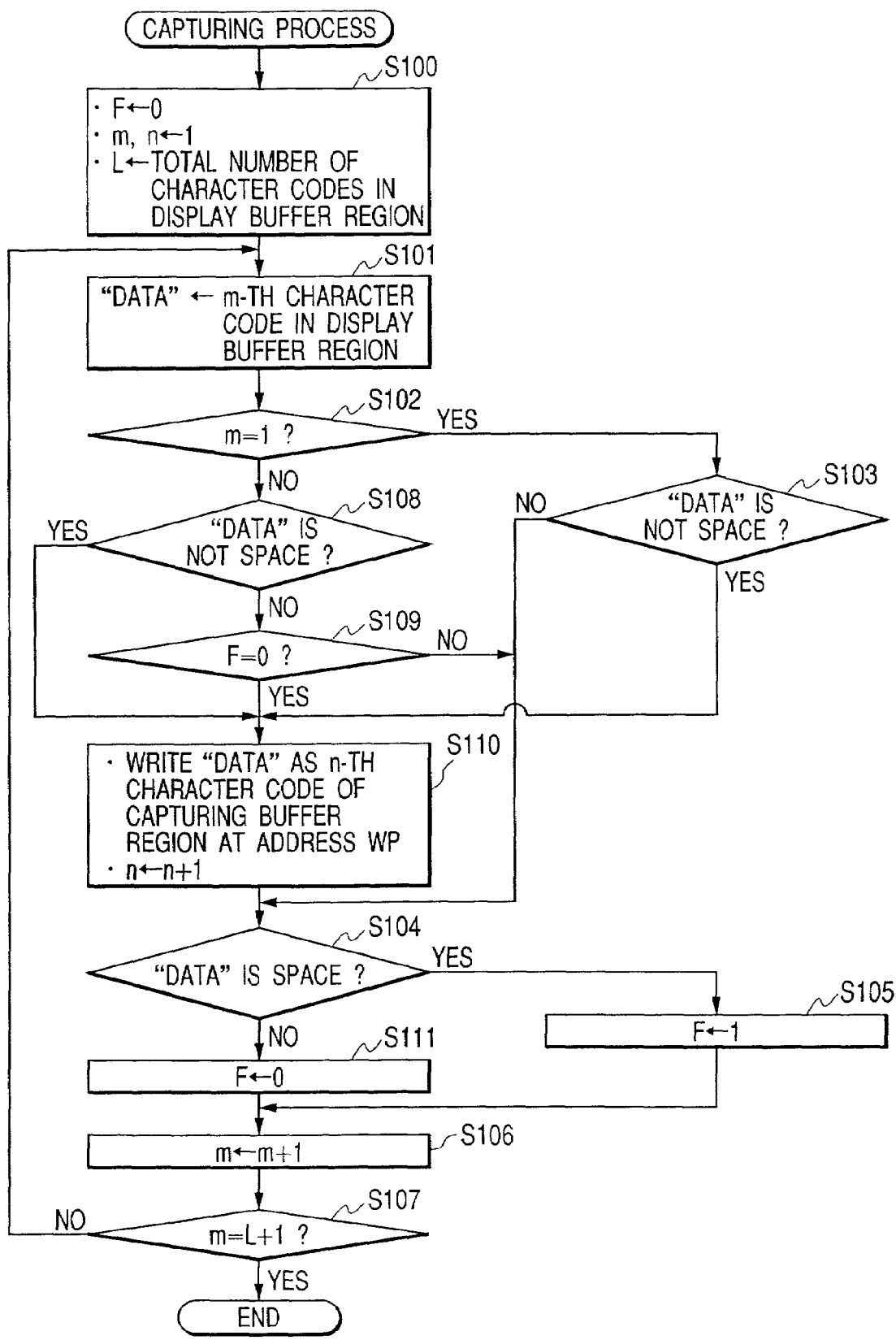
FIG. 4 is a flow chart illustrating a control operation to be executed by the first system controller.
Figure 5:
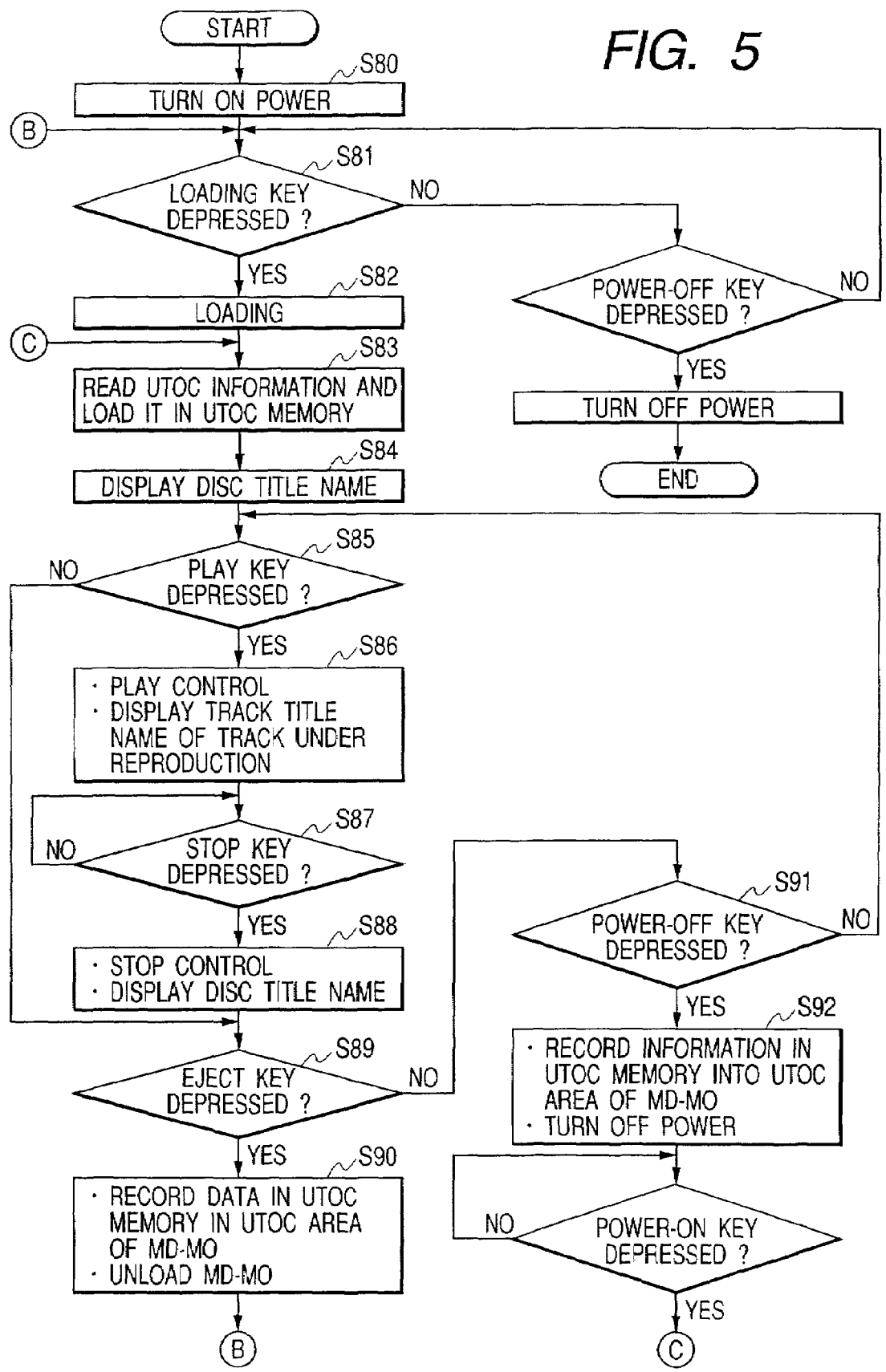
FIG. 5 is a flow chart illustrating a control operation to be executed by a second system controller.
Figure 18A:
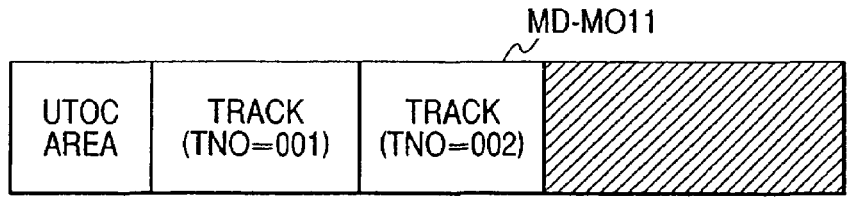
FIGS. 18A and 18B are diagrams illustrating the record contents of an MD-MO.

The operation of the embodiment constructed as above will be described with reference to FIGS. 2 to 19. FIGS. 2 to 4 are flow charts illustrating the control operation to be executed by the first system controller 7. FIGS. 5 to 7 are flow charts illustrating the control operation to be executed by the second system controller 17. FIGS. 8 to 11 are diagrams illustrating the display contents on the text display 6. FIG. 12 is a diagram illustrating the data stored in the display buffer region 5A of the memory 5, FIG. 13 is a diagram illustrating the data stored in the capturing buffer region 5B of the memory 5, and FIGS. 14 to 17 are diagrams illustrating the data stored in the title inputting region 5C. FIG. 18 is a diagram illustrating the record contents of MD-MO 11. FIG. 19 is a diagram illustrating the display contents of the text display 16.

In the off-state of the title input mode, the first system controller 7 controls the text display 16 to display a header text received from FM multiplexed text broadcasting, in the header text row. For the simplicity of description, the description of the reception/display of a header text is omitted. It is assumed that no data is stored at first in the capturing buffer region 5B of the memory 5. It is also assumed that two music programs are already recorded on tracks of the track numbers 001 and 002 of MD-MO 11 and that a track title name "オンリー・ユー/フラターズ" of the track number is already recorded in the UTOC area as the title name information (refer to FIG. 18A).

(1) Capturing Received Text Information

When the power-on operation is effected by depressing the power on/off key of the key operating unit 4 of the tuner unit 1, the first system controller 7 performs a power-on control for each block of the tuner unit 1 to make the tuner 3 enter an operation state and tune in the station tuned immediately before the previous power-off. It is assumed herein that the tuner 3 tunes in an FM multiplexed text broadcasting station. The tuner 3 outputs audio signals received from an FM multiplexed broadcasting station and outputs on the page unit basis the received main text information of Level 1 received from the FM multiplexed broadcasting station. After the power is turned on, the first system controller 7 clears the contents of the display buffer region 5A, sets the off-state of the title input mode, and counts on the page unit basis the received text information in the capturing buffer region 5B to use the count as a write pointer WP. In this case, WP=0 (refer to Step S50 shown in FIG. 2). Each time the first system controller 7 is supplied with the received main text information of one page from the tuner 3, the first system controller 7 writes the received main text information in the display buffer region 5A and makes the text display 6 display it (refer to Steps S51 and S52, FIGS. 8A and 12A).

Consider, for example, that a CD is reproduced and broadcast and an album name "OLDIES" of CD and a manufacture name "DAIICHI CO." are transmitted as the main text information of one page. In this case, the transmission side controls the broadcasting so that "OLDIES" is displayed on the text display 6 in the first main text row at the center thereof by entering a proper number of space codes before and after "OLDIES" and that "DAIICHI CO." is displayed on the text display in the second main text row at the center thereof by entering a proper number of space codes before and after "DAIICHI CO." (refer to FIGS. 8A and 12A).

It is assumed that the first and second CD music programs under broadcasting happen to be the same as the first and second music programs of MD-MO 11 a user dubbed. In the example described earlier, the disc title name of MD-MO 11 and the track title name of the second music program are not still entered. If "OLDIES" and "DAIICHI" are desired to be entered as a portion of the disc title name, the capturing key of the key operating unit 4 is depressed. In response to this, the first system controller 7 writes the received main text information of one page stored in the display buffer region 5A, in the capturing buffer region 5B at an address 0 indicated by WP (Steps S53 and S54) to thereafter increment WP by 1 (Step S55). In this case, spaces in the received text information other than one space immediately after characters are all deleted to remove redundant character information, so that when the received character information is used thereafter as the character information of the title name, unnecessary spaces are not formed.

Figure 12A:
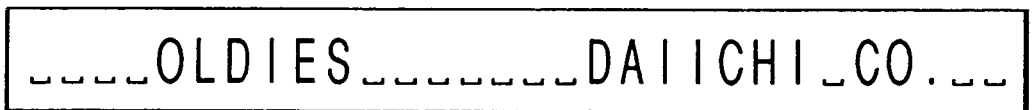
FIGS. 12A and 12B are diagrams illustrating the contents of a display buffer region in a memory of the tuner unit.
Figure 12B:
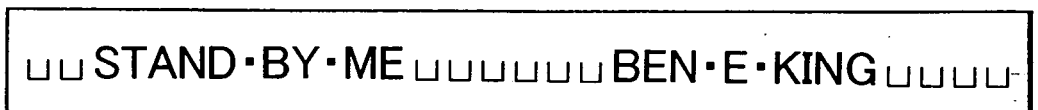
Figure 14A:
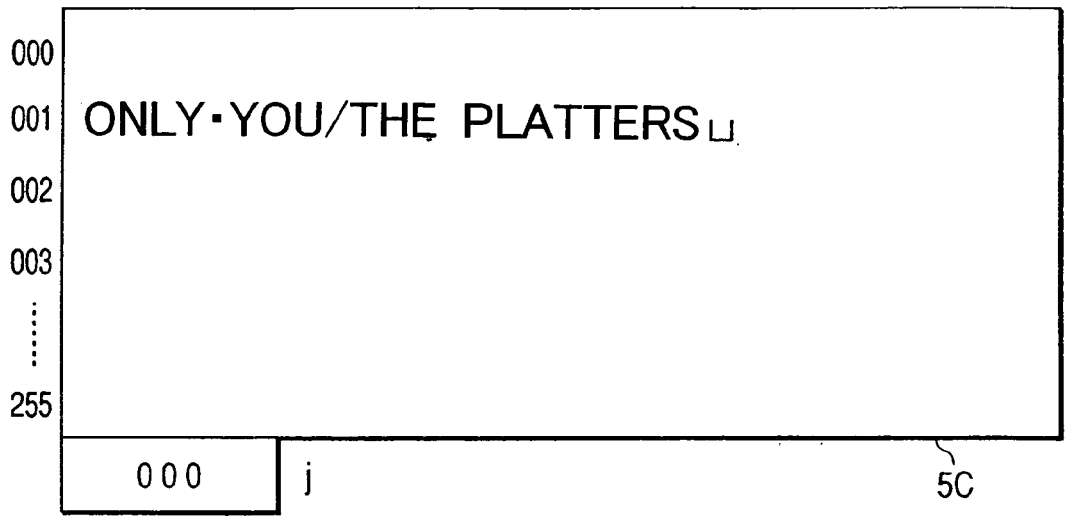
FIGS. 14A and 14B are diagrams illustrating the contents of the memory a title inputting region in of the tuner unit.
Figure 14B:
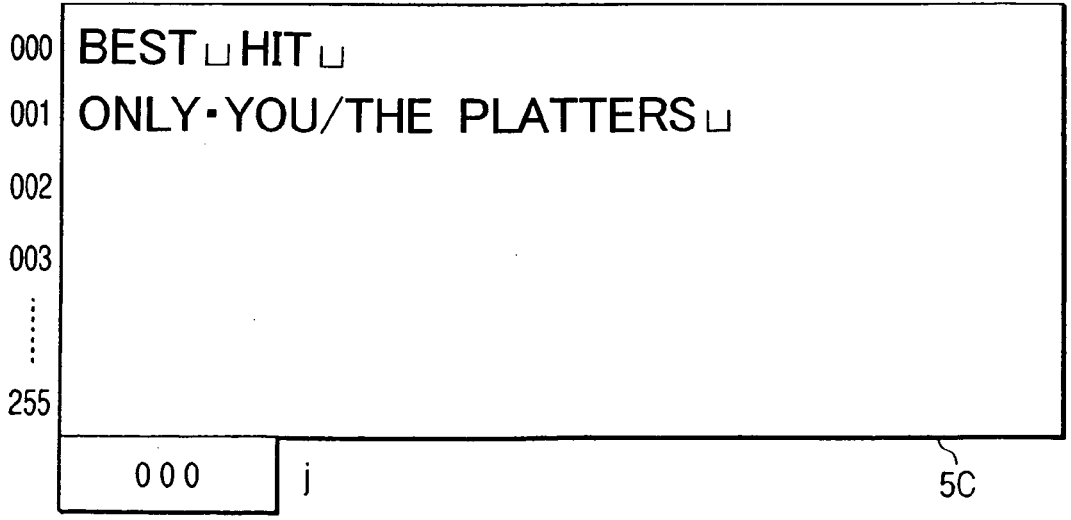

More specifically, as shown in the flow chart of FIG. 4, first a flag F (0: other than space, 1: space) is cleared which indicates whether a character code immediately before is a space or not, a character position m in the display buffer region 5A and a character position n in the capturing buffer region 5B are both set to 1, and the number of all character codes in the display buffer region 5A is set to L. Assuming that the data stored in the display buffer region 5A is as shown in FIG. 12A, then L=30 (Step S100 in FIG. 4). The (m=1)-th character code (in this example, space) in the display buffer region 5A is set as "data" (Step S101). Since m=1 at the first time (YES at Step S102), the flow advances to step S103 whereat it is checked whether the "data" is a character code other than the space. In this example, since this judgement is NO, the flag F is set to 1 without writing the data in the capturing buffer region 5B (YES at Step S104, Step S105). Then, m is incremented to 2 (Step S106). Since m is not L+1 (NO at Step S107), the flow returns to Step S101.

At Step S101, the (m=2)-th character code (in this example, again space) in the display buffer region 5A is set as "data". Since it is not m=1 (NO at Step S102), the flow advances to Step S108 whereat it is checked whether "data" is a character code other than the space. Since this judgement is NO, it is checked whether F is 0 (Step S109). Since this judgement is also NO, the data is not written in the capturing buffer region 5B, and F is set to 1 (YES at Step S104, Step S105). Since m is not L+1 (NO at Step S107), the flow returns to Step S101.

Similar processes are repeated to the fourth character code (space) in the display buffer region 5A, without writing the data in the capturing buffer region 5B. At m=5, the fifth character code ("O") in the display buffer region 5A is set to the "data" at Step S101. In this case, the judgement at Step S108 is YES because the "data" is not the space. The flow advances therefore to Step S110 whereat the "data" is written as the (n=1)-th character code in the capturing buffer region 5b at the address of WP=0, and n is incremented to 2 (refer to FIG. 13A). Thereafter, since the "data" is not the space (NO at the judgement Step S104), F is cleared and m is set to 6 (Steps S111, S106).

Returning back to Step S101, the sixth character code ("L") in the display buffer area 5A is set to the "data". The judgement at Step S108 is YES so that the flow advances to Step S110 whereat the "data" is written as the (n=2)-th character code in the capturing buffer region 5B at the address WP and n is incremented to 3 (refer to FIG. 13A). Thereafter, F is cleared and m is set to 7 (Steps S111, S106).

Similar operations are repeated to the tenth character "S" in the display buffer region 5A to write the "data" in the capturing buffer region 5B, and it becomes that n=7 and m=11. Then, at Step S101 the eleventh character code (space) in the display buffer region 5A is set to the "data". Since the "data" is the space, the judgment at Step S108 is NO. However, since F=0, the next judgement at Step S109 is YES so that the flow advances to Step S110 whereat the "data" is written as the (n=7)-th character code in the capturing buffer region 5B at the address W and n is incremented to 8 (refer to FIG. 13A). Thereafter, since the "data" is the space (YES at the judgement Step S104), F is set to 1 and m is set to 12 (Steps S105, S106).

Returning back to Step S101, the twelfth character code (space) in the display buffer area 5A is set to the "data". The judgements at both Steps S108 and S109 are NO so that the "data" is not written in the capturing buffer region 5B and F is set to 1 (YES at Step S104, Step S106), to thereafter return to Step S101.

Similar operations are repeated to the seventeenth character code (space) in the display buffer region 5A and the "data" is not written in the capturing buffer region 5B, and it becomes that m=18. Then, at Step S101 the eighteenth character code ("D") in the display buffer region 5A is set to the "data". Since the "data" is not the space, the judgment at Step S108 is YES so that the flow advances to Step S110 whereat the "data" is written as the (n=8)-th character code in the capturing buffer region 5B at the address WP and n is incremented to 9 (refer to FIG. 13A). Thereafter, since the "data" is not the space (NO at the judgement Step S104), F is cleared and m is set to 19 (Steps S111, S106).

Similarly, the nineteenth to twenty ninth characters in the display buffer region 5A are written as the ninth to nineteenth characters in the capturing buffer region 5B at the address of WP=0. The thirtieth character space in the display buffer region 5A is not written in the capturing buffer region 5B.

With the above processes, "OLDIES DAIICHI CO." is sequentially written starting from the top character in the capturing buffer region 5B at the address of WP=0. Spaces in the display buffer region 5A excepting those immediately after the character other than the space are omitted (refer to FIGS. 12A and 13A).

Next, while the name "スタンド・バイ・ミ-" of the second music program of CD and the artist name "ベン・E・キング" are received and displayed as the main text information of one page (refer to FIGS. 8B and 12B), the capturing key of the key operating unit 4 is depressed. In this case, the first system controller 7 writes the received text information in the display buffer region 5A in the capturing buffer region 5B at the address of WP=1 (Steps S53 and S54). WP is then incremented to 2 (Step S55). Also in this case, spaces in the received text information other than one space immediately after characters are all deleted to remove redundant character information, so that when the received character information is used thereafter as the character information of the title name, unnecessary spaces are not formed.

With the above operations, "スタンド・バイ・ミ- ベン・E・キング" are sequentially written starting from the top character in the capturing buffer region 5B at the address of WP=1. Spaces in the display buffer region 5A excepting those immediately after the character other than the space are omitted (refer to FIGS. 12B and 13B).

(2) Setting and Reproducing of MD-MO

When a power-on operation is effected by depressing the power on/off key of the key operating unit 14 of the MD recorder unit 10, the second system controller 17 performs a power-on control for each block of the MD recorder unit (At Step S80 shown in FIG. 5). Thereafter, MD-MO 11 is placed on the tray and the loading key of the key operating unit 14 is depressed. In response to this, the second system controller 17 makes the loading unit 12 perform a loading control and makes the MD recording/reproducing unit 13 set MD-MO 11. Thereafter, the second system controller 17 controls the MD recording/reproducing unit 13 to read the UTOC information from the UTOC area and store it in the UTOC memory 15 (Steps S81 to S83). If a disc title name is contained in the read UTOC information, it is displayed on the text display 16 (Step S84). However, in this example, since it is assumed that the UTOC information does not contain the disc title name, it is not displayed on the text display 16.

If it is desired to reproduce MD-MO 11, the PLAY key of the key operating unit 14 is depressed. In response to this, the second system controller 17 makes the CD recording/reproducing unit 13 perform a PLAY control to sequentially reproduce music programs starting from the first music program. If the track under reproduction has the track title name, it is displayed on the text display 16 (Steps S85 and S86). In this example, since the track title name "ユ-／ブラク-ス" of the first music program is recorded, it is displayed on the text display 16 while the first music program is reproduced (refer to FIG. 19B). When the STOP key is depressed thereafter, the second system controller 17 makes the CD recording/reproducing unit 13 perform a STOP control to stop the reproducing operation (Steps S87 and S88).

(3) Input of Disc Title Name

If a user wishes to input a disc title name of MD-MO 11 and a track title name of the second music program, MD-MO 11 is set to the MD recording/reproducing unit 13 of the MR recorder unit 10, and thereafter the title input key of the key inputting unit 4 of the tuner unit 1 is depressed. In response to this, the first system controller 7 enters the title input mode. The first system controller 7 transmits first a transfer request signal for the UTOC information to the second system controller 17 of the MD recorder unit 10. Upon reception of the request signal, the second system controller 17 uses an interrupt process to transmit all title name information in the UTOC information stored in the UTOC memory 15 to the first system controller 7. Upon reception of the title name information, the first system controller 7 stores it in the title inputting region 5C in such a manner that the information corresponds to each of the track numbers 000 to 255 (refer to Steps S56 and S57 in FIG. 2, Step S120 in FIG. 6, and FIG. 14A).

Figure 8A:
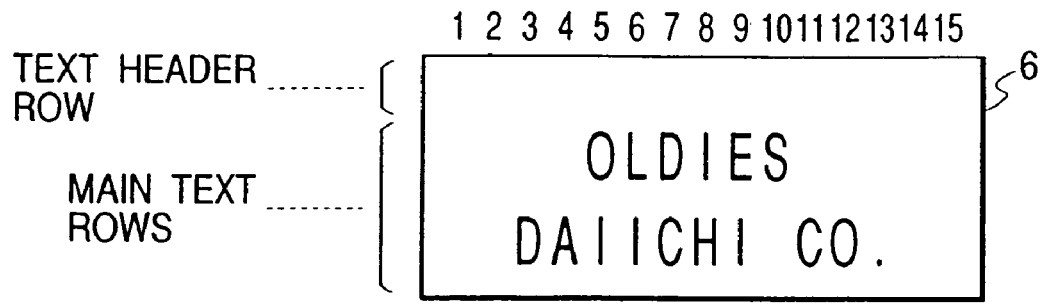
FIGS. 8A to 8D are diagrams illustrating the display contents of a text display of a tuner unit.
Figure 8B:
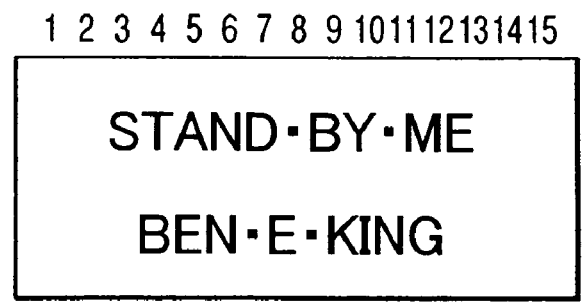
Figure 8C:
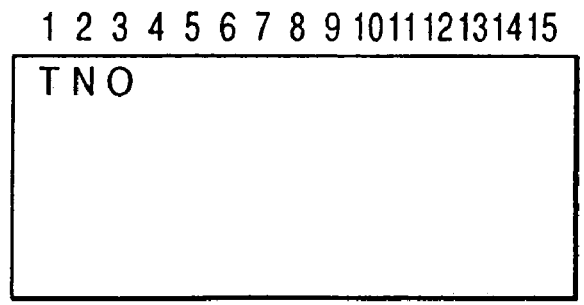
Figure 8D:
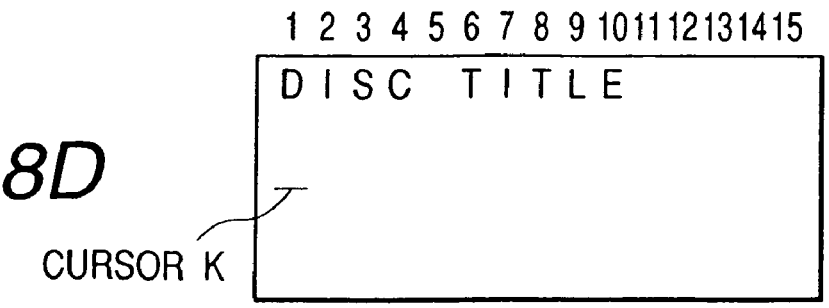
Figure 9A:
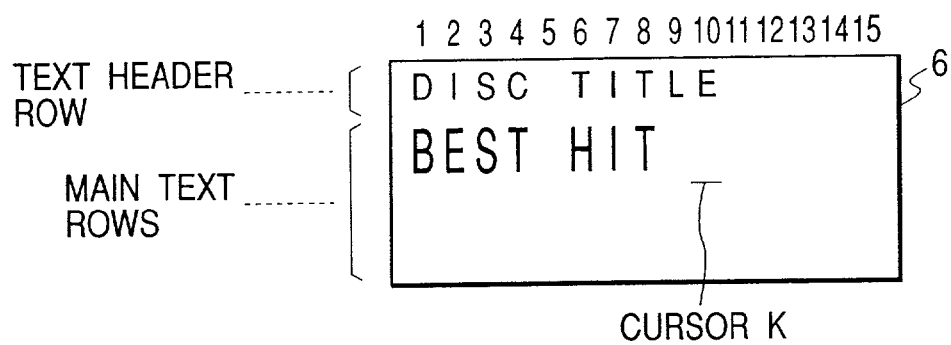
FIGS. 9A to 9D are diagrams illustrating the display contents of the text display of the tuner unit.
Figure 9B:
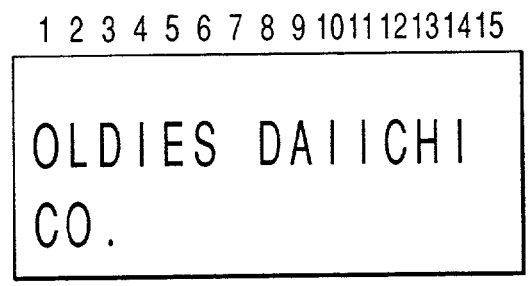
Figure 9C:
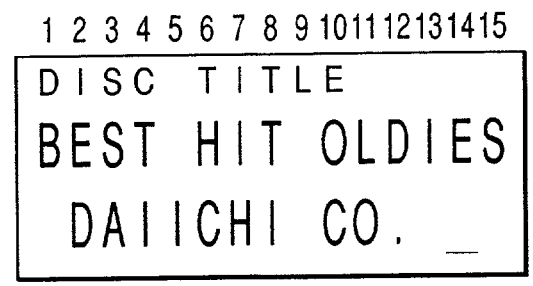
Figure 9D:
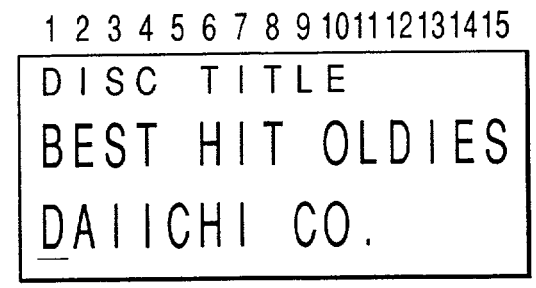
Figure 11A:
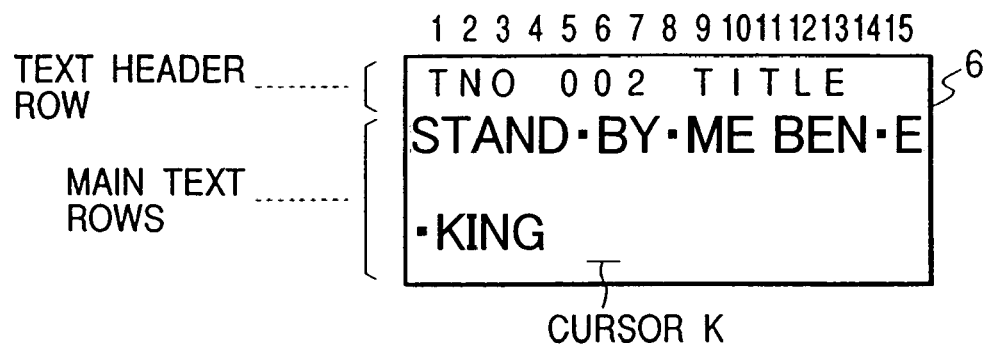
FIGS. 11A to 11C are diagrams illustrating the display contents of the text display of the tuner unit.
Figure 11B:
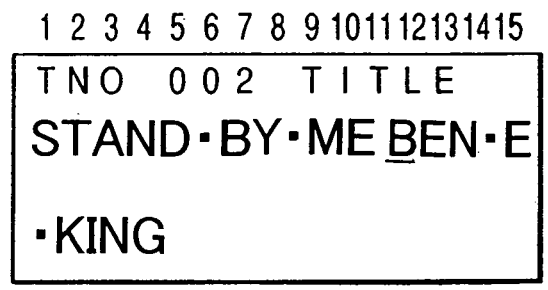
Figure 11C:
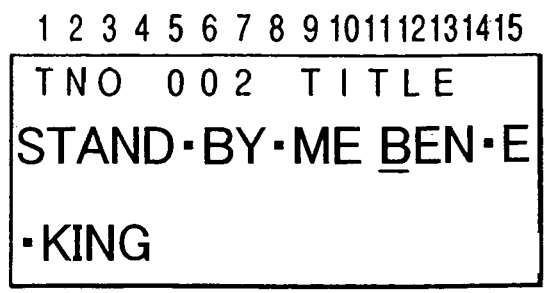

Thereafter, the first system controller 7 stands by until a track number is entered, clears the main text rows of the text display 6, and displays "TNO" in the text header row (refer to Step S60 in FIG. 3, and FIG. 8C). When a user inputs "000," with numeral keys 4B which indicates that the title input target unit is the disc, j=000 is written in the title inputting region 50 of the memory 5 to register that the title name input target unit is the disc (refer to FIG. 14A), and "DISC TITLE" is displayed in the text header row of the text display 6. If the disc title name corresponding to the track number 000 is contained in the title inputting region 5C, it is displayed in the main text rows of the text display 6. In this example, however, since the disc title name is not contained, it is not displayed and the cursor (refer to K in FIG. 8D) is displayed in the first main text row at the first character position (refer to Steps S61 and S62, FIG. 8D).

If the user wishes to input a disc title name "BEST HIT OLDIES/DAIICHI", the character key "B" is first depressed so that "B" is registered in the title inputting region 5C as the first character of the title name text information corresponding to the track number of j=000, to thereby display "B" at the first character position in the first main text row of the text display 6 and move the cursor to the second character position (Steps S63 and S64). Next, "E", "S", "T", " " "(space)", "H", "I", "T", and " " (space) are input so that "EST HIT" is registered in the title inputting region 5C as the second and following characters of the title name text information corresponding to the track number of j=000, to thereby display "EST HIT" at the second and following character positions in the first main text row of the text display 6 and move the cursor to the tenth character position (refer to Steps S63 and S64, FIG. 9A and FIG. 14B).

As the next portion of "OLDIES/DAIICHI", the already received text information of the text multiplexing broadcasting is used. First, the call key is depressed. In response to this, the first system controller 7 sets a read pointer RP in the capturing buffer region 5B to 0, and reads the received main text information "OLDIES DAIICHI CO." of one page from the capturing buffer region 5B at the address of RP=0 to display it in the main text rows of the text display 6 (refer to Steps S65 to S67, FIG. 9B and FIG. 14B).

After the user confirms that the displayed text information is the desired information, the ENTER key is depressed. In response to this, the first system controller 7 writes (adds) the received text information in the capturing buffer region 5B at the address of RP=0, i.e., "OLDIES DAIICHI CO." in the title inputting region 5C so that it is inserted as a portion of the title name text information corresponding to the track number of j=000, after the title name text information displayed on a disc title input screen (refer to FIG. 9A) immediately before, between the cursor position and the position one character before. The text display 6 is made to resume the disc title input screen and additionally display "OLDIES DAIICHI CO." at positions from after "BEST HIT" in the first main text row of the text display 6 to the second row, and the cursor is moved to the thirteenth character position in the second main text row (refer to Steps S68 and S69, FIG. 9C and FIG. 15A).

If the disc title name "BEST HIT OLDIES DAIICHI CO." is not necessary to be changed, it can be settled by depressing the ENTER key. However, if "OLDIES" and "DAIICHI" are to be delimited by "/" (slash) and the last "CO." is to be deleted, then the cursor is moved to the position of ""(space) (start position in the second main text row) between "OLDIES" and "DAIICHI", and the one-character delete key is depressed. Upon depression of this key, the characters after " " (space) are moved forward by one character both in the title name text information in the title inputting region 5C corresponding to the track number of j=000 and in the displayed characters on the text display 6. Therefore, "D" is moved to the position of " " (space) (cursor stays at the start position in the second main text row. Refer to Steps S63 and S64, FIG. 9D and FIG. 15B). Thereafter, "/" is input so that "/" is entered between "D" and "S" one character before "D" and the characters after "D" are moved backward by one character both in the title name text information in the title inputting region 5C corresponding to the track number of j=000 and in the displayed characters on the text display 6 (cursor moves to the second character position in the second main text row. Refer to Steps S63 and S64, FIG. 10A and FIG. 16A).

Next, the cursor is moved to "C" of "CO." and the one-character delete key is depressed four times. In response to this, the four characters "C", "O", "." and " " (space) are deleted both in the title name text information in the title inputting region 5C corresponding to the track number of j=000 and in the displayed characters on the text display 6, and the cursor moves to the position next to " " (space) immediately after "DAIICHI" (Refer to Steps S63 and S64, FIGS. 10B and 16B).

With the above operations, a desired disc title name is completed. When the ENTER key is depressed, the first system controller 7 settles this disc title name as the title name text information in the title inputting region 5C corresponding to the track number of j=000, erases the characters in the main text rows of the text display 6, and displays "TNO" in the text header row to thereafter stand by until a track number is input (refer to Steps S70 and S60, FIG. 8C).

(4) Input of Track Title Name

Next, if a title name of a track having recorded musical tone signals is desired to be input relative to the track having the track number 002 as a title input target unit, "002" is first input with numeral keys. In response to this, the first system controller 7 writes j=002 in the title inputting region 5C of the memory 5 to register that the title input target unit is the track having the track number 002, and thereafter displays "TNO 002 TITLE" on the text display 6 in the text header row. If the title name text information of the track number 002 is contained in the title inputting region 5C, this information is displayed on the text display 6 in the main text rows. However, in this example, since it is assumed that the title inputting region 5C does not contain the track title text information, it is not displayed on the text display 16 and the cursor is displayed at the first character position in the first main text row (refer to Steps S61 and S62, FIG. 10C).

If a user wishes to write a track title name "スタンド・バイ・ミ−/ベン・E・キング", the already received text information from the text multiplexing broadcasting is used. First, the call key is depressed. In response to this, the first system controller 7 sets a read pointer RP in the capturing buffer region 5B to 0, and reads the received main text information "OLDIES DAIICHI CO." from the capturing buffer region 5B at the address of RP=0 to display it on the text display 6 (refer to Steps S65 to S67, FIG. 9B). When the user depresses thereafter the next key, the first system controller 7 increments RP by 1 to read the received text information "スタンド・バイ・ミ−/ベン・E・キング" from the capturing buffer region 5B at the address RP and display it on the text display 6 (refer to Steps S71 and S72, FIG. 10D).

After the user confirms that the displayed text information is the desired information, the ENTER key is depressed. In response to this, the first system controller 7 writes (adds) the received text information in the capturing buffer region 5B at the address RP, i.e., "スタンド・バイ・ミ−/ベン・E・キング" in the title inputting region 5C, so that it is inserted as a portion of the title name text information corresponding to the track number of j=002, after the title name text information displayed on a track title input screen (refer to FIG. 9E) immediately before, between the cursor position and the position one character before. The text display 6 is made to resume the track title input screen and additionally displays "スタンド・バイ・ミ−ベン・E・キング" at positions from the cursor position in the main text rows of the text display 6 to the second main text row, and the cursor is moved to the fifth character position in the second main text row (refer to Steps S68 and S69, FIG. 11A and FIG. 17A).

If the track title name "スタンド・バイ・ミ−ベン・E・キング" is not necessary to be changed, it can be settled by depressing the ENTER key. However, if "スタンド・バイ・ミ−" and "ベン・E・キング" are to be delimited by "/" (slash), then the cursor is moved to the position of " " (space) (eleventh character position in the first main text row) between "スタンド・バイ・ミ−" and "ベン・E・キング" and the one-character delete key is depressed. Upon depression of this key, the characters after " " (space) are moved forward by one character both in the title name text information in the title inputting region 5C corresponding to the track number of j=002 and in the displayed characters on the text display 6. Therefore, "ベ" is moved to the position of " " (space) (cursor stays at the eleventh character position in the first main text row. Refer to Steps S63 and S64, FIG. 11B).

Thereafter, "/" is input so that "/" is entered between "ベ" and "−" one character before "ベ" and the characters after "ベ" are moved backward by one character both in the title name text information in the title inputting region 5C corresponding to the track number of j=002 and in the displayed characters on the text display 6 (cursor moves to the twelfth character position in the first main text row. Refer to Steps S63 and S64, FIG. 11C and FIG. 17B).

With the above operations, a desired disc title name is completed. When the ENTER key is depressed, the first system controller 7 settles this track title name as the title name text information in the title inputting region 5C corresponding to the track number of j=002, erases the characters in the main text rows of the text display 6, and displays "TNO" in the text header row to thereafter stand by until a track number is input (refer to Steps S70 and S60, FIG. 8C).

(5) Record of Title Name in MD-MO

In this state, since there is no track number relative to which a title name is input, when the title input key is depressed, the first system controller 7 turns off the title input mode, interrupts the second system controller 17, and transfers the contents of the title inputting region 5C. During this interrupt process, the second system controller 17 overwrites the title name information in the UTOC information stored in the UTOC memory in accordance with the contents transferred from the first system controller 7 (refer to Steps S73 to S75 shown in FIG. 3, Step S130 shown in FIG. 7).

Figure 18B:
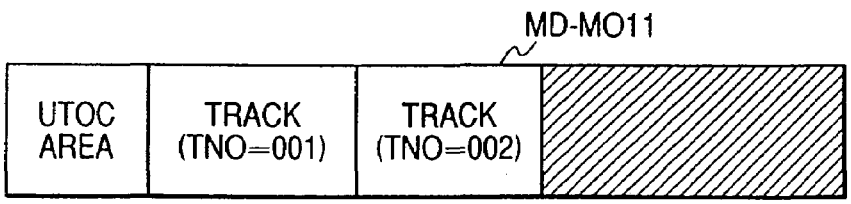
Figures 20A, 20B, 20C, 20D:
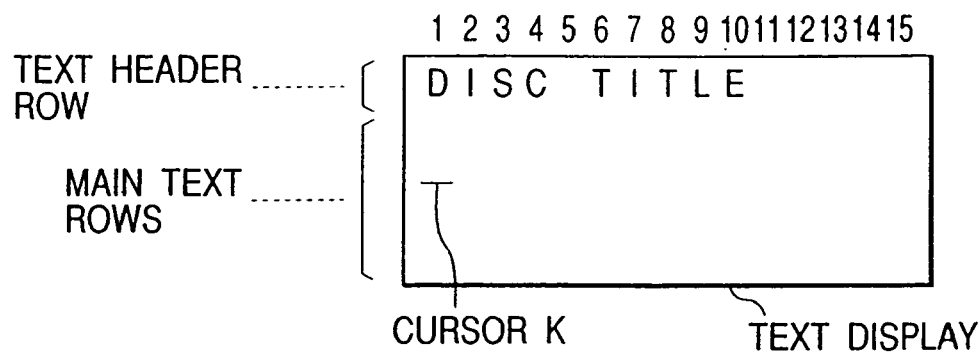
FIGS. 20A to 20D are diagrams illustrating the display contents of a conventional text display during a title input operation.
Figure 21A:
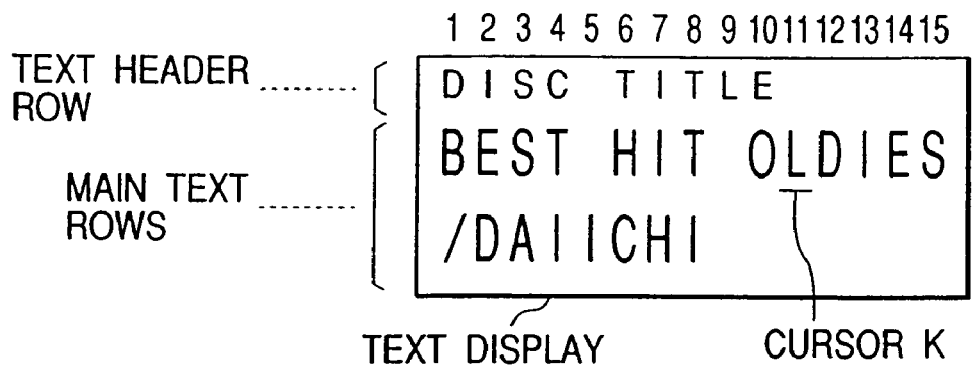
FIGS. 21A to 21D are diagrams illustrating the display contents of the conventional text display during a title input operation.
Figure 21B:
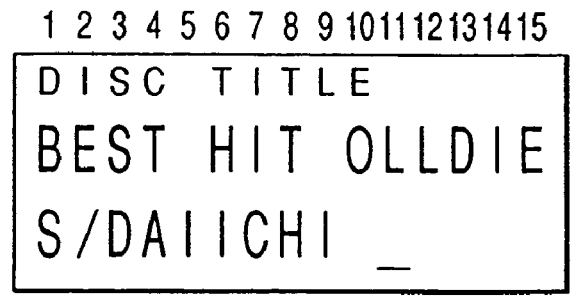
Figure 21C:
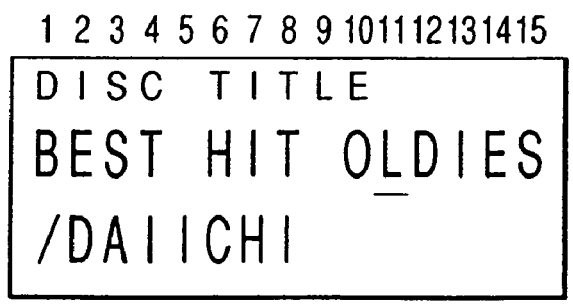
Figure 21D:
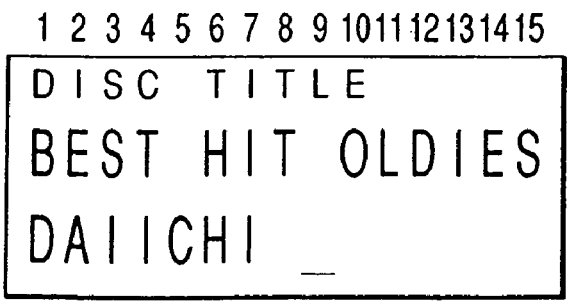
Figure 22A:
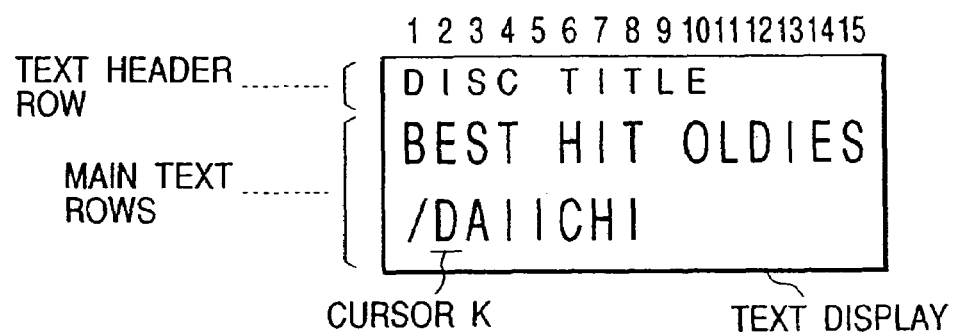
Figure 22B:
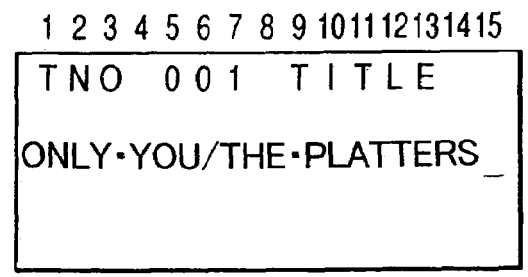

Thereafter, when an eject operation is performed in the suspension state of the MD recording/reproducing unit 13, the second system controller 17 controls the MD recording/reproducing unit 13 to record the contents in the UTOC memory 15 in the UTOC area of MD-MO 11, and thereafter controls the loading unit 12 to unload MD-MO 11 (refer to Steps S89 and S90 shown in FIG. 5, and to FIG. 18B). If the power-off operation is performed in the suspension state of the MD recording/reproducing unit 13, the contents of the UTOC memory 15 are also recorded in the UTOC area of MD-MO 11 to thereafter perform the power-off control (Steps S91 and S92).

(6) When MD-MO 11 recorded with the title names is again loaded thereafter, the disc title name "BEST HIT OLDIES/

DAIICHI" is displayed on the text display 16 in the suspension state of the MD recording/reproducing unit 13 (refer to Steps S81 to S83, FIG. 19A). Therefore, a user can confirm at a glance whether the disc is a desired one. During the reproduction of the track having the track number 001, the track title name "オンリー・ユー/プラターズ" is displayed (refer to FIG. 19B), whereas during the reproduction of the track having the track number 002, the track title name "スタンド・バイ・ミー/ベン・E・キング" is displayed (refer to FIG. 19C). It is therefore possible to confirm at a glance whether the music program is a desired one (Steps S85 and S86).

According to this embodiment, a user performs a title name input operation to input a disc title name of a disc selected as a title input target unit or to input a track title name of a track selected as a title input target unit from tracks having track numbers of 001 to 255. In this case, received text information from FM multiplexed text broadcasting can be used as the whole or a portion of the title name. Therefore, the title name input work can be performed easily.

When text information is captured from FM multiplexed text broadcasting, redundant text information such as consecutive spaces in the received text information is automatically deleted. Therefore, the displayed title name becomes easy to be read, and a task of deleting the redundant text information to make the displayed title name easy to be read can be omitted. Although the maximum number of characters of a disc title name and a track title name is limited, the title name can contain a large amount of meaningful text information because the redundant text information in the received text information is automatically deleted.

In this embodiment, an album name, an album name manufacture name, a music program name and an artist name are illustratively used as the title name. Instead, the title name may be arbitrary character information which can confirm at a glance whether a disc or a track is a desired one, such as a movie title name, a portion of a music text, an explanation of music, and the name of a person, a district name and a book title respectively not directly related to music.

When the first system controller 17 writes the received text information in the display buffer region 5A in the capturing buffer region 5B when the capturing key is depressed, the redundant text information such as consecutive spaces is automatically deleted. Instead, the redundant text information may not be deleted when the received text information is written, but it may be deleted at a different timing. Namely, when the ENTER key is depressed while desired text information is generated from the received text information in the capturing buffer region 5B by operating upon the call key and cursor key and displayed on the text display 6, the displayed text information is written in the title inputting region 5C in such a way that the information corresponds to the current title input target unit. At this timing, the redundant text information may be deleted.

In the embodiment, when the redundant text information is deleted, all spaces in the received text information excepting one space immediately after a character other than the space are deleted. Instead, one of the spaces sandwitched between character strings other than the space may be left and the other spaces may be deleted, and the one left space is automatically replaced by a delimiter symbol such as "/".

The tuner unit 1 and MD recorder unit 10 may be formed integrally and the first and second system controllers 7 and 17 may be realized by a single system controller.

If the MD recorder unit has a sound record function, the UTOC information in the UTOC memory may be recorded on MD-MO after the sound record is completed.

The tuner 3 for receiving text information may be a tuner different from the FM multiplexed text broadcasting receiving tuner, such as a TV multiplexed text broadcasting receiving tuner. A title name input target medium is not limited only to MD-MO, but other media such as a VTR cassette tape, a DAT cassette tape and a DVD-RAM may also be used.

INDUSTRIAL APPLICABILITY

According to the present invention, desired text information is captured from text broadcasting and is used as a title name of a desired title input target, the title name being recorded thereafter in a recording medium. A user work of inputting a title name can be considerably reduced.

The invention claimed is:

1. A title input device for a recording medium, comprising:
   a receiving tuner that receives text broadcasting and outputs received text information;
   a display that displays the received text information output from the receiving tuner;
   a first system controller that stores the received text information in a capturing buffer region when a first key instructs to selectively capture the received text information;
   a second key that selects a target unit of the recording medium to input a title, a music signal having already been recorded on the recording medium;
   a third key that instructs to call desired received text information from the capturing buffer region; and
   a second system controller that reads the desired received text information instructed to be called by the third key from the received text information stored in the capturing region buffer and records the desired received text information in the recording medium as a title name of the target unit selected by the second key, in response to operations of the third key and the second key.

2. The input device for a recording medium according to claim 1, wherein the first system controller performs a program of detecting and deleting redundant text information when the first system controller stores the received text information in the capturing buffer region when the first key instructs to capture the received text information.

3. The input device for a recording medium according to claim 1, wherein the second system controller performs a program of detecting and deleting redundant text information when the second system controller reads the desired received text information instructed to be called by the third key from the received text information stored in the capturing buffer region and records the desired received text information in the recording medium as a title name of the target unit selected by the second key.

4. A title device for a recording medium, comprising:
   a receiving tuner that receives text broadcasting and outputs received text information;
   a display that displays the received text information output from the receiving tuner;
   a first system controller that stores the received text information in a capturing region buffer when a first key instructs to selectively capture the received text information;

a second key that selects a target unit of the recording medium to input a title name character, a music signal having already been recorded on the recording medium;

a title inputting region that stores a title name input by a user corresponding to the unit;

wherein the first system controller instructs to call desired received text information from the capturing region buffer;

a second system controller that writes a title name character input by the user in the title inputting region corresponding to the target unit desired by the user, reading the desired text information stored in the capturing buffer region when the first system controller instructs to call the desired received text information, and writing the title name in the title inputting region corresponding to the target unit desired by the user, in response to an operation of the second key; and wherein the second system controller records the title name corresponding to the target unit and stored in the title inputting region in the recording medium at a predetermined timing.

5. The title input device for a recording medium according to claim 4, wherein the first system controller performs a program of detecting and deleting redundant text information when the first system stores the received text information in the capturing buffer region when the first key instructs to capture the received text information.

6. The title input device for a recording medium according to claim 4, wherein the second system controller performs a program of detecting and deleting redundant text information when the second system controller reads the desired text information stored in the capturing buffer region when the first system controller instructs to call the desired received text information, and writes the title name in the title inputting region corresponding to the target unit desired by the user.

7. A title input method for a recording medium comprising:

receiving text broadcasting and outputting text information;

storing the text information selectively designated with designating key in the storage memory;

calling desired text information from the storage memory;

manually selecting a target unit of the recording medium in order to input the desired text information as a title; a music signal having already been recorded on the recording medium; and recording the desired text information as the title of the target unit of the recording medium.

* * * * *